(12) United States Patent
Groves, II et al.

(10) Patent No.: US 10,408,073 B2
(45) Date of Patent: Sep. 10, 2019

(54) COOLED CMC WALL CONTOURING

(71) Applicant: General Electric Company, Schenectady, NY (US)

(72) Inventors: Robert Charles Groves, II, West Chester, OH (US); Kirk D. Gallier, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 621 days.

(21) Appl. No.: 15/001,572

(22) Filed: Jan. 20, 2016

(65) Prior Publication Data

US 2017/0204734 A1    Jul. 20, 2017

(51) Int. Cl.
*F01D 9/06* (2006.01)

(52) U.S. Cl.
CPC ........ *F01D 9/065* (2013.01); *F05D 2250/182* (2013.01); *F05D 2250/184* (2013.01); *F05D 2250/294* (2013.01); *F05D 2260/201* (2013.01); *F05D 2260/22141* (2013.01); *F05D 2300/6033* (2013.01); *Y02T 50/672* (2013.01); *Y02T 50/676* (2013.01)

(58) Field of Classification Search
USPC ....................................................... 416/96 A
See application file for complete search history.

(56) References Cited

U.S. PATENT DOCUMENTS

| | | | |
|---|---|---|---|
| H1380 H | 12/1994 | Halila et al. | |
| 5,586,866 A * | 12/1996 | Wettstein | F01D 5/189 416/96 A |
| 6,142,734 A * | 11/2000 | Lee | F01D 5/189 249/117 |
| 6,238,183 B1 * | 5/2001 | Williamson | F01D 5/189 416/96 A |
| 6,325,593 B1 | 12/2001 | Darkins, Jr. et al. | |
| 6,439,846 B1 * | 8/2002 | Anderson | F01D 5/187 416/96 A |
| 6,997,673 B2 | 2/2006 | Morris et al. | |
| 7,908,867 B2 | 3/2011 | Keller et al. | |
| 8,870,537 B2 | 10/2014 | Lee | |
| 2002/0062945 A1 * | 5/2002 | Hocker | F01D 5/189 165/53 |
| 2010/0068034 A1 * | 3/2010 | Schiavo | F01D 5/189 415/115 |
| 2011/0232299 A1 | 9/2011 | Stryapunin et al. | |

(Continued)

*Primary Examiner* — Jason D Shanske
*Assistant Examiner* — Jason G Davis
(74) *Attorney, Agent, or Firm* — Dority & Manning, P.A.

(57) ABSTRACT

A stator component of a turbine engine having an airfoil defining a radial cooling channel, the airfoil having an airfoil outer surface and an airfoil inner surface. The airfoil outer surface defines a leading edge portion, a trailing edge portion, a pressure side wall, and a suction side wall. The airfoil inner surface defines a series of alternating peaks and valleys in the leading edge portion such that the airfoil has a varying cross-sectional thickness defined between the airfoil inner surface and the airfoil outer surface in the leading edge portion. A strut is disposed within the radial cooling channel and defines an inner radial cooling passage. The strut has an outer surface that defines a plurality of apertures that provide for fluid communication from the inner radial cooling passage to a radial cooling gap defined between the airfoil inner surface and the outer surface of the strut.

20 Claims, 9 Drawing Sheets

(56) References Cited

U.S. PATENT DOCUMENTS

| | | |
|---|---|---|
| 2012/0070302 A1 | 3/2012 | Lee |
| 2014/0075947 A1* | 3/2014 | Gautschi ................. F01D 5/189 |
| | | 60/726 |
| 2014/0321980 A1 | 10/2014 | Lee et al. |
| 2015/0198050 A1* | 7/2015 | Lee ......................... F01D 5/188 |
| | | 415/115 |

* cited by examiner

COOLED CMC WALL CONTOURING

FIELD OF THE INVENTION

The present subject matter relates generally to cooling of ceramic matrix composite (CMC) gas turbine engine airfoil components, and more particularly to stator vane components having an inner cooling channel.

BACKGROUND OF THE INVENTION

A turbofan type gas turbine engine includes a gas turbine core having a low pressure compressor, high pressure compressor, combustor, a high pressure turbine and a low pressure turbine in serial flow relationship. The gas turbine is operable in a known manner to generate a primary gas flow. The high pressure turbine and the low pressure turbine generally include annular arrays ("rows") of stationary vanes or nozzles that direct combustion gases exiting the combustor downstream into a corresponding row of rotating turbine blades. Collectively, one row of nozzles and one row of turbine blades make up a stage.

The rows of stationary vanes and turbine blades operate at extremely high temperatures and must be cooled by airflow or other cooling medium to ensure adequate service life. The stationary vanes are often configured as an annular array of stator components having airfoils or airfoil-shaped vanes that extend radially between annular inner and outer bands which at least partially define a primary flow or hot gas path through the nozzle.

The temperatures within gas turbines may exceed 2500° F. Due to these extreme operating temperatures within the gas turbine engine, it is desirable to utilize materials with a low coefficient of thermal expansion for the airfoils and/or the inner and outer bands. For example, to operate effectively in such strenuous temperature and pressure conditions, composite materials have been suggested, in particular for example, ceramic matrix composite (CMC) materials. The relatively low coefficient of thermal expansion CMC materials have higher temperature capability than metallic parts, thus allowing for higher operating temperatures within the engine resulting in higher engine efficiency.

However, stationary vanes formed from ceramic materials still requiring cooled via a cooling medium, such as compressed air, that is routed through various cooling circuits defined within the stator components. If the cooling scheme or system is not configured correctly with properly positioned impingement flow of the cooling medium against the inner side of the airfoil, undesirable camberwise and/or through-wall thermal gradients may result. Therefore, an improved system for cooling the airfoil portion of the stator vane component formed from a CMC material would be desirable.

BRIEF DESCRIPTION OF THE INVENTION

Aspects and advantages of the invention will be set forth in part in the following description, or may be obvious from the description, or may be learned through practice of the invention.

In one embodiment, a stator component of a turbine engine is disclosed as having an airfoil defining a radial cooling channel, the airfoil having an airfoil outer surface and an airfoil inner surface. The airfoil outer surface defines a leading edge portion, a trailing edge portion, a pressure side wall, and a suction side wall. The airfoil inner surface defines a series of alternating peaks and valleys in the leading edge portion such that the airfoil has a varying cross-sectional thickness defined between the airfoil inner surface and the airfoil outer surface in the leading edge portion. A strut is disposed within the radial cooling channel and defines an inner radial cooling passage. The strut has an outer surface that defines a plurality of apertures that provide for fluid communication from the inner radial cooling passage to a radial cooling gap defined between the airfoil inner surface and the outer surface of the strut.

In another embodiment, a nozzle assembly is disclosed having a plurality of nozzle segments annularly arranged and coupled together via an outer support ring and an inner support ring. Each nozzle segment has a stator component having an airfoil defining a radial cooling channel. The airfoil has an airfoil outer surface and an airfoil inner surface. The airfoil outer surface defines a leading edge portion, a trailing edge portion, a pressure side wall, and a suction side wall. The airfoil inner surface defines a series of alternating peaks and valleys in the leading edge portion such that the airfoil has a varying cross-sectional thickness defined between the airfoil inner surface and the airfoil outer surface in the leading edge portion. A strut is disposed within the radial cooling channel and defines an inner radial cooling passage. The strut has an outer surface that defines a plurality of apertures that provide for fluid communication from the inner radial cooling passage to a radial cooling gap defined between the airfoil inner surface and the outer surface of the strut.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
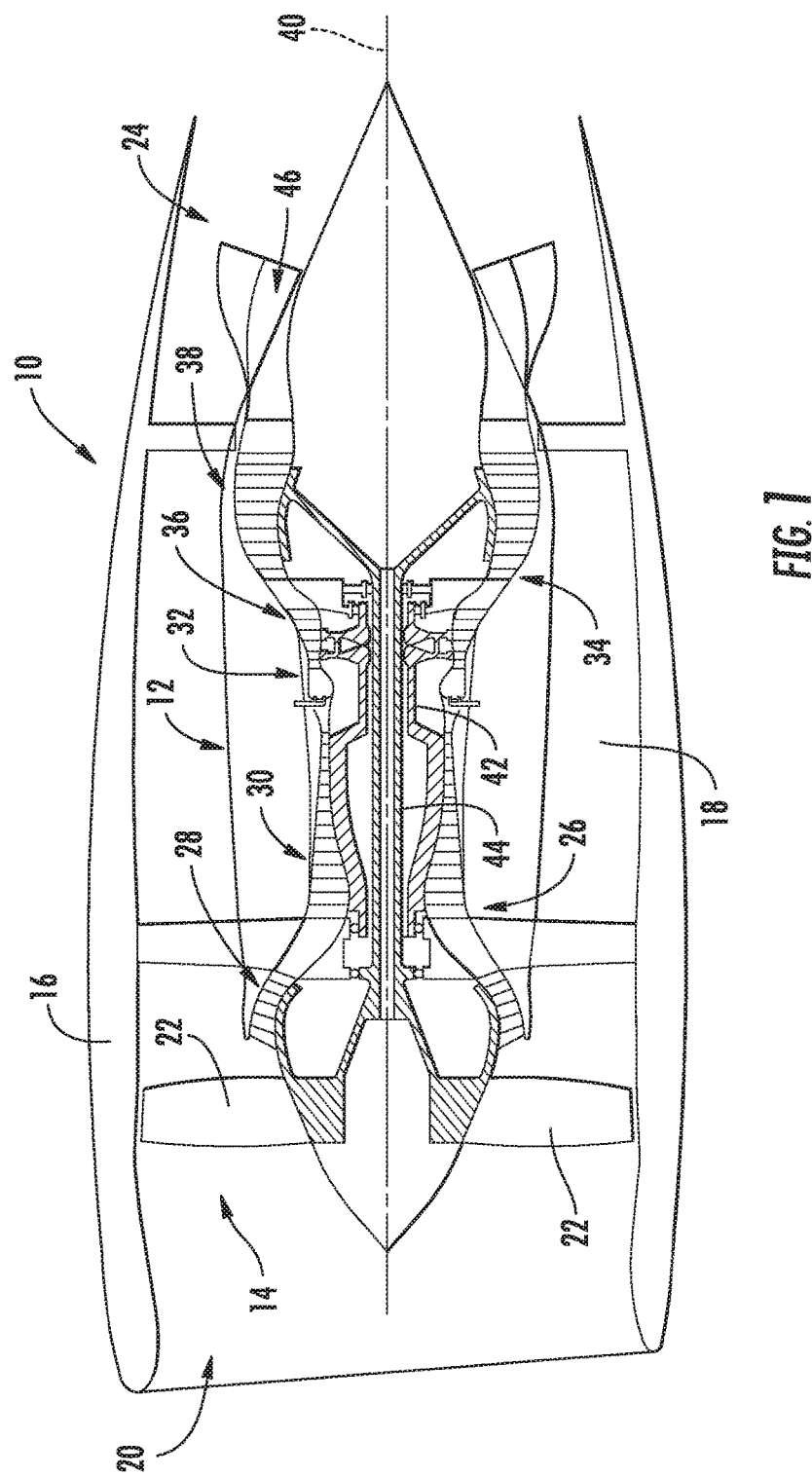
FIG. 1 is a schematic cross-sectional view of an exemplary high bypass turbofan jet engine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear of the engine. As used herein, the terms "radial" or "radially" refer to a dimension extending between a center longitudinal axis of the engine and an outer engine circumference. As used herein, the "mean camber line" or "mean line" or "camber line" is the locus of points midway between the suction (upper) and pressure (lower) surfaces of the airfoil.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

A cooled stator component is generally provided, which can lead to thermal stress reduction within the structure. In one embodiment, the cooled stator component has local variations in wall thickness (e.g., a repeating thick, thin, thick pattern) in at least a portion of the component, which can be tailored to hot gas loading and internal impingement cooling to maintain CMC and coating temperature limits. For example, the structure can have an alternating or contouring CMC wall thickness, for example in a nozzle airfoil, to comply with the respective higher and lower through-wall heat fluxes due to internal cooling magnitude and/or external heat loading and resulting through-wall thermal gradients. Any local thermal stresses of the cooled CMC components can be tailored, with variable CMC wall thicknesses, which lead to a radial cooling gap having an increased flow path area (i.e., a longer flow path), in response to the hot gas loading. Thinner portions of the CMC material (i.e., at the valleys defined by the inner surface) provide a higher through-material heat conductance path for transferring thermal loads faster into the cooling air before exhausting, especially at the impingement points. As such, the CMC material thickness can be customized to match a predetermined airfoil thermal loading profile that varies the local heat transfer coefficient in accordance with the flow path of the radial cooling gap.

CMC has the advantage of allowing ply and matrix construction on a very localized basis. Where leading edge heat load is high and internal impingement is required to limit maximum temperatures, the wall thickness can be less to increase the localized heat removal. Where heat loads are less, such as mid-camber pressure and suction walls, yet some cooling is still required, the wall thickness can be greater at impingement to lessen the thermal stress imposed by temperature gradients. Here, alternating the thickness of the CMC wall also allows local thicker sections to share stress loads where high cooling is required. Additionally, the contoured profile of the radial cooling gap provides more surface area to enable greater heat pick up in the coolant, which also is beneficial to adjacent sections.

Referring now to the drawings, wherein identical numerals indicate the same elements throughout the figures, FIG. 1 is a schematic cross-sectional view of an exemplary high by-pass turbofan type engine or "turbofan" 10, as may incorporate various embodiments of the present invention. The turbofan 10 generally includes a gas turbine engine or propulsor 12, a fan section 14 that is mechanically coupled to the gas turbine engine 12 and a nacelle or outer casing 16 that extends circumferentially around at least a portion of the gas turbine engine 12. The nacelle 16 and the gas turbine engine 12 at least partially define a high by-pass duct 18 through the turbofan 10. The function of the gas turbine engine 12 is to extract energy from high pressure and temperature combustion gases and convert the energy into mechanical energy for work.

The nacelle 16 at least partially defines an inlet 20 of the turbofan 10. Air enters the turbofan 10 via the inlet 20 and passes across a plurality of fan blades 22 of the fan section 14. A primary portion of the air flows through the high by-pass duct 18 and is exhausted from an outlet or aft end 24 of the turbofan 10, thus providing a large portion of the overall thrust produced by the turbofan 10.

A secondary portion of the air is routed into a compressor section 26 of the gas turbine engine 12. The compressor section 26 generally includes, in serial flow order, a low pressure (LP) axial-flow compressor 28 and a high pressure (HP) axial-flow compressor 30. A combustion section 32 is disposed downstream from the compressor section 26 and a multi-stage turbine 34 is disposed downstream from the combustion section 32.

The multi-stage turbine 34 may include a high pressure (HP) turbine 36 and a low or lower pressure (LP) turbine 38 disposed downstream from the HP turbine 36. The compressor portion 26, the combustion section 32 and the multi-stage turbine 34 are all located along an engine axis 40. The HP turbine 26 is connected to the HP compressor 30 via rotor shaft 42. The LP turbine is connected to the LP compressor 28 via rotor shaft 44. The fan blades 22 may be connected to rotor shaft 44 via a reduction gear or may be coupled to rotor shaft 44 via various mechanical/structural means.

In operation, the compressed air from the compressor section 26 is mixed with fuel and burned in the combustion section 32, thus providing hot combustion gas which exits the combustion section 32 and flows into the HP turbine 36 of the multi-stage turbine 34. At the HP turbine 36, kinetic and thermal energy is extracted from the hot combustion gas causing rotation of turbine blades disposed within the HP turbine 36 which in turn causes rotation of rotor shaft 42. Rotation of rotor shaft 42 supports operation of the HP compressor 30. The combustion gas then flows from the HP turbine 36 to the LP turbine 38 where additional kinetic and thermal energy is extracted from the hot combustion gas causing rotation of turbine blades which in turn causes rotation of rotor shaft 44. The combustion gas is then exhausted from the multi-stage turbine 34 via turbine exhaust duct 46. Rotation of rotor shaft 44 supports operation of LP compressor 28 and causes rotation of the fan blades 22. Collectively, the gas turbine engine 12 and the fan section 14 contribute to produce overall thrust and/or power generated by the turbofan 10.

Figure 2:
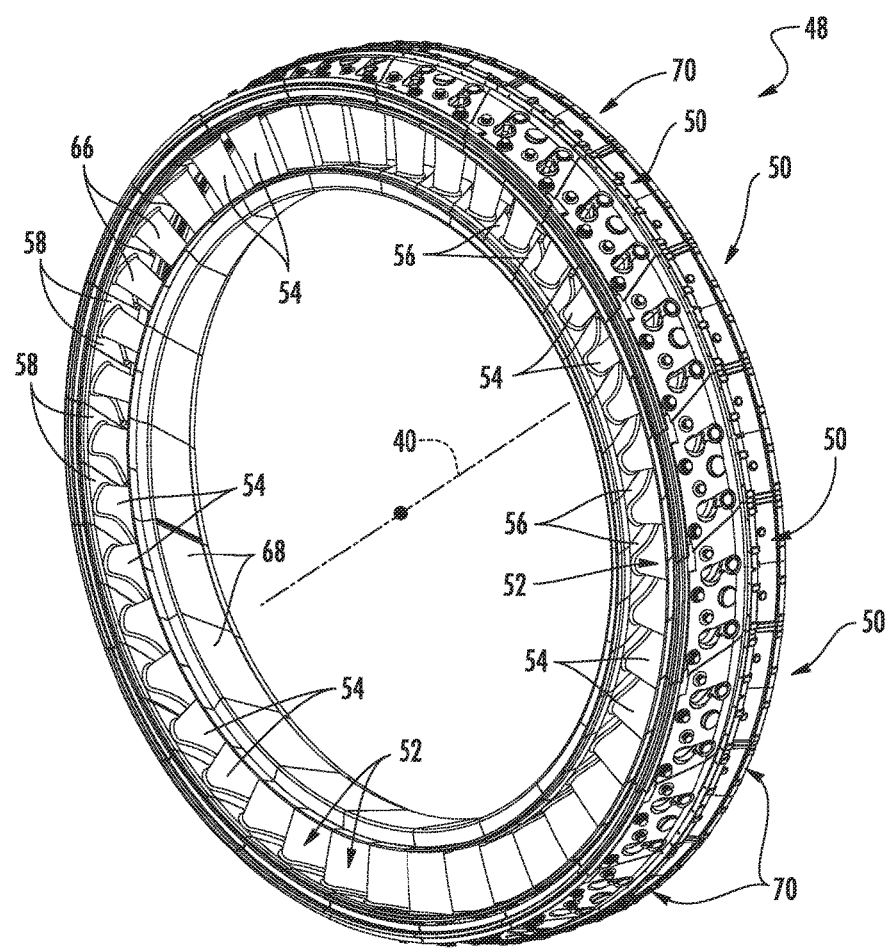
FIG. 2 is a perspective view of an exemplary nozzle ring assembly as may incorporate various embodiments of the present invention.

FIG. 2 provides a perspective view of an exemplary nozzle ring assembly 48 as may incorporate various embodiments of the present invention. The nozzle ring assembly 48 may be located within the HP turbine 36 or the LP turbine 38 (FIG. 1). Additionally, one or more nozzle ring assemblies may be utilized in the LP compressor 28 and/or the HP compressor 30. When incorporated into the HP turbine 36 or the LP turbine 38, the nozzle ring assembly 48 directs the combustion gas downstream through a subsequent row of rotor blades (not shown) extending radially outwardly from a supporting rotor shaft such as rotor shafts 42 and 44 (FIG. 1).

Figure 3:
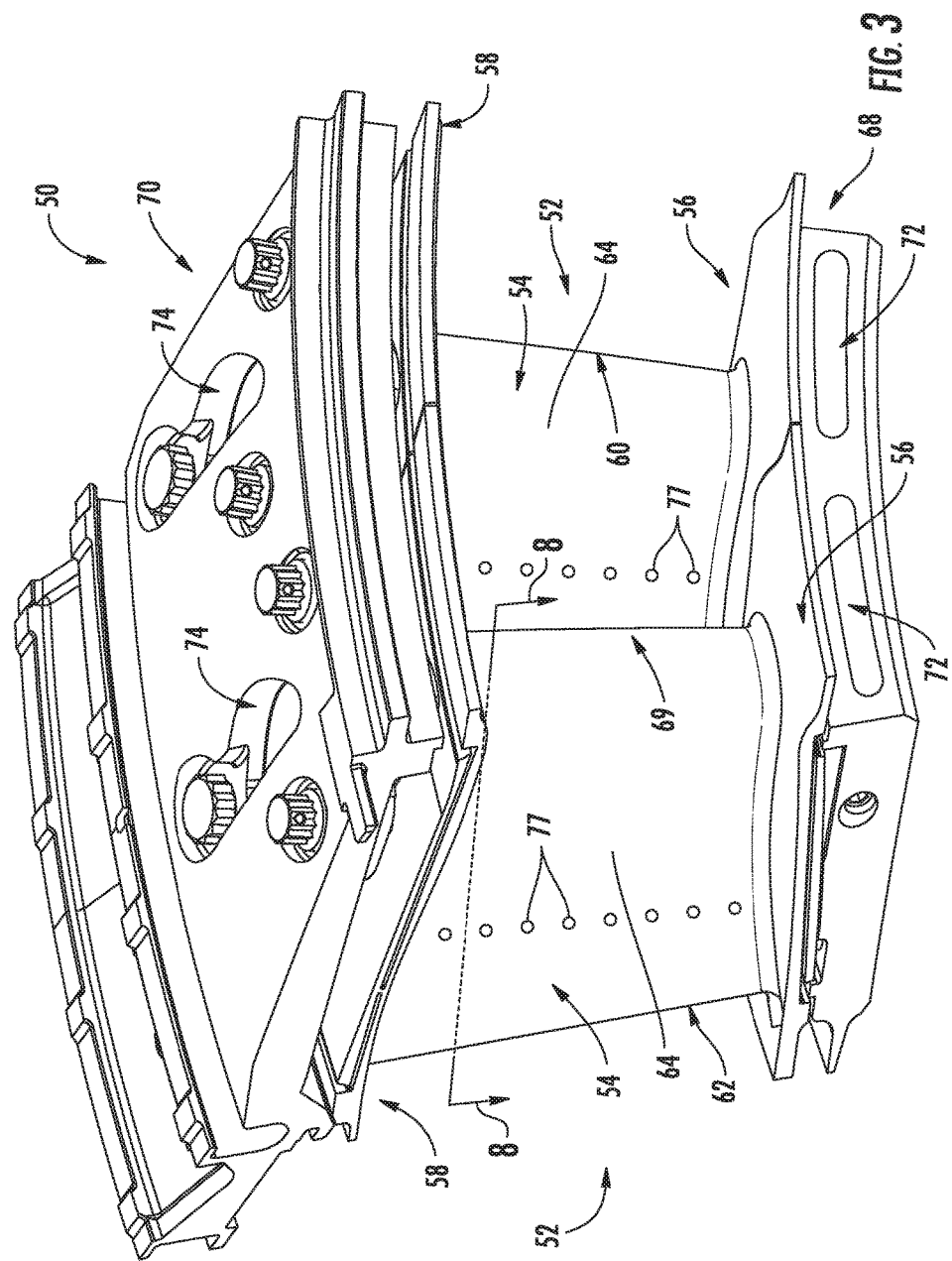
FIG. 3 is a perspective view of an exemplary stage 1 nozzle segment of the nozzle ring assembly as shown in FIG. 2.

As shown in FIG. 2, the nozzle ring assembly 48 is formed of one or more nozzle segments 50. FIG. 3 provides a perspective view of an exemplary nozzle segment 50 as shown in FIG. 2, as may incorporate various embodiments of the present disclosure. As shown in FIGS. 2 and 3, each nozzle segment 50 includes at least one stator component 52. For example, in the exemplary embodiment, as shown in FIGS. 2 and 3, each nozzle segment 50 may include two stator components 52 in a "doublet" configuration. In other configurations, each nozzle segment 50 may include one stator component 52 in a "singlet" configuration (not shown).

As shown in FIGS. 2 and 3, each stator component 52 generally includes a vane or airfoil 54 that extends substantially radially in span with respect to axis 40 between an inner band 56 and an outer band 58 of the stator component 52. The inner and outer bands 56, 58 define inner and outer flow boundaries for the combustion gas flowing through the nozzle segment assembly 50.

As shown in FIG. 3, each airfoil 54 includes a leading edge portion 60, a trailing edge portion 62, a generally concave pressure side wall 64 and a generally convex suction side wall 66 (FIG. 2). In particular embodiments, at least a portion of the stator component 52, including the inner band 56, the outer band 58 and/or the airfoil 54 may be formed from a relatively low coefficient of thermal expansion material, including but not limited to a ceramic matrix composite (CMC).

In particular embodiments, as shown in FIGS. 2 and 3, each nozzle segment 50 includes and/or is attached to an inner support ring(s) 68 disposed radially inwardly from the inner band(s) 56 and a hanger or outer support ring(s) 70 disposed radially outwardly from the outer bands 58. The inner support rings 68 and/or the outer support rings 70 may provide structural or mounting support for each stator component 52 and/or the corresponding nozzle segment 50.

In particular embodiments, as shown in FIG. 3, the inner support ring 68 defines at least one rotor purge air passage 72 and/or the outer support ring 70 defines at least one cooling flow inlet 74 that is in fluid communication with a cooling medium source and with the purge air passage 72. The purge air passage 72 allows the cooling air to exit the inner support ring 68 in either or both of a circumferential or axial direction. As shown in FIG. 2, the inner and outer bands 56, 58, the inner support ring 68 and the hanger or outer support ring 70 extend 360 degrees about the nozzle ring assembly 48 with respect to the engine axis 40.

Figure 4:
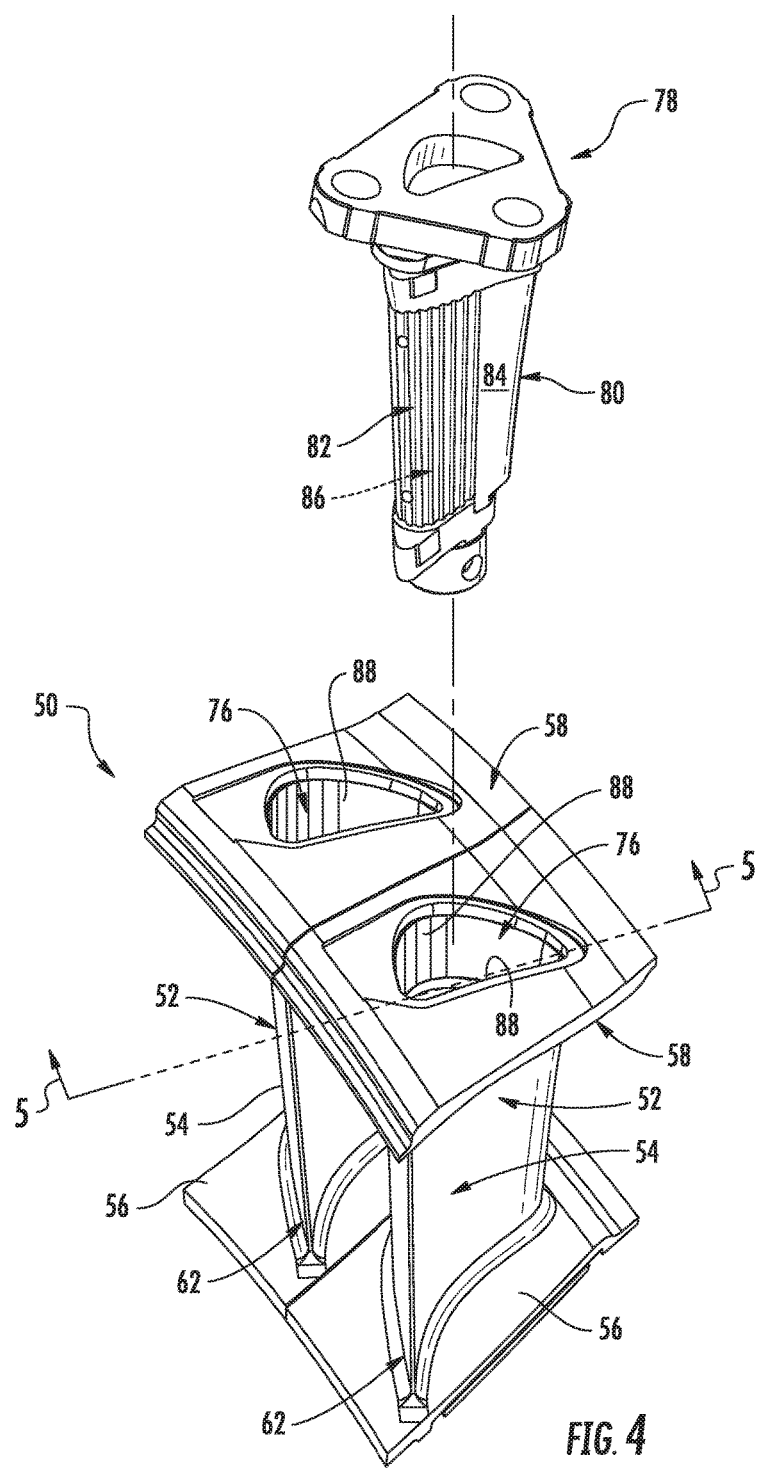
FIG. 4 is an exploded view of a portion of the nozzle segment as shown in FIG. 3 according to one or more embodiments of the present invention.

FIG. 4 provides an exploded perspective view of a portion of the exemplary nozzle segment 50 as provided in FIG. 3 with the inner support ring 68 and the outer support ring 70 removed for clarity, according to various embodiments of the present disclosure. In various embodiments, as shown in FIG. 4, each stator component 52 includes a radial cooling channel 76. The radial cooling channel 76 extends and/or is defined radially through the outer band 58, the airfoil 54 and the inner band 56. In particular embodiments, the radial cooling channel 76 is in fluid communication with the cooling flow inlet 74 (FIG. 3). In particular embodiments, the radial cooling channel 76 is in fluid communication with the rotor purge air passage 72 (FIG. 3). In the exemplary embodiment, as shown in FIG. 4, the stator component 52 comprises a single radial cooling channel 76.

In various embodiments, as shown in FIG. 3, the airfoil 54 may include a plurality of film holes 77 defined along an outer surface of the airfoil 54 and in fluid communication with the radial cooling channel 76 to provide film cooling to the outer surfaces and/or portions of the airfoil 54. In addition, the film holes 77 provide for localized bore or through-hole cooling of the airfoil 54. For example, as shown in FIG. 3, the airfoil 54 may include a plurality of film holes 77 along the pressure side wall 64 and/or the suction side wall 66 (not shown). The film holes 77 allow for localized bore or through-hole cooling of the airfoil 54 where hotspots may form.

Other locations of the airfoil 54 may further comprise film holes 77 in order to provide a desirable operating temperature for the airfoil 54. In particular embodiments, the airfoil 54 may include a plurality of radially and/or axially spaced rows of the film holes 77. In particular embodiments, the films holes 77 may be from about 10 to about 30 mils in diameter.

Figure 5:
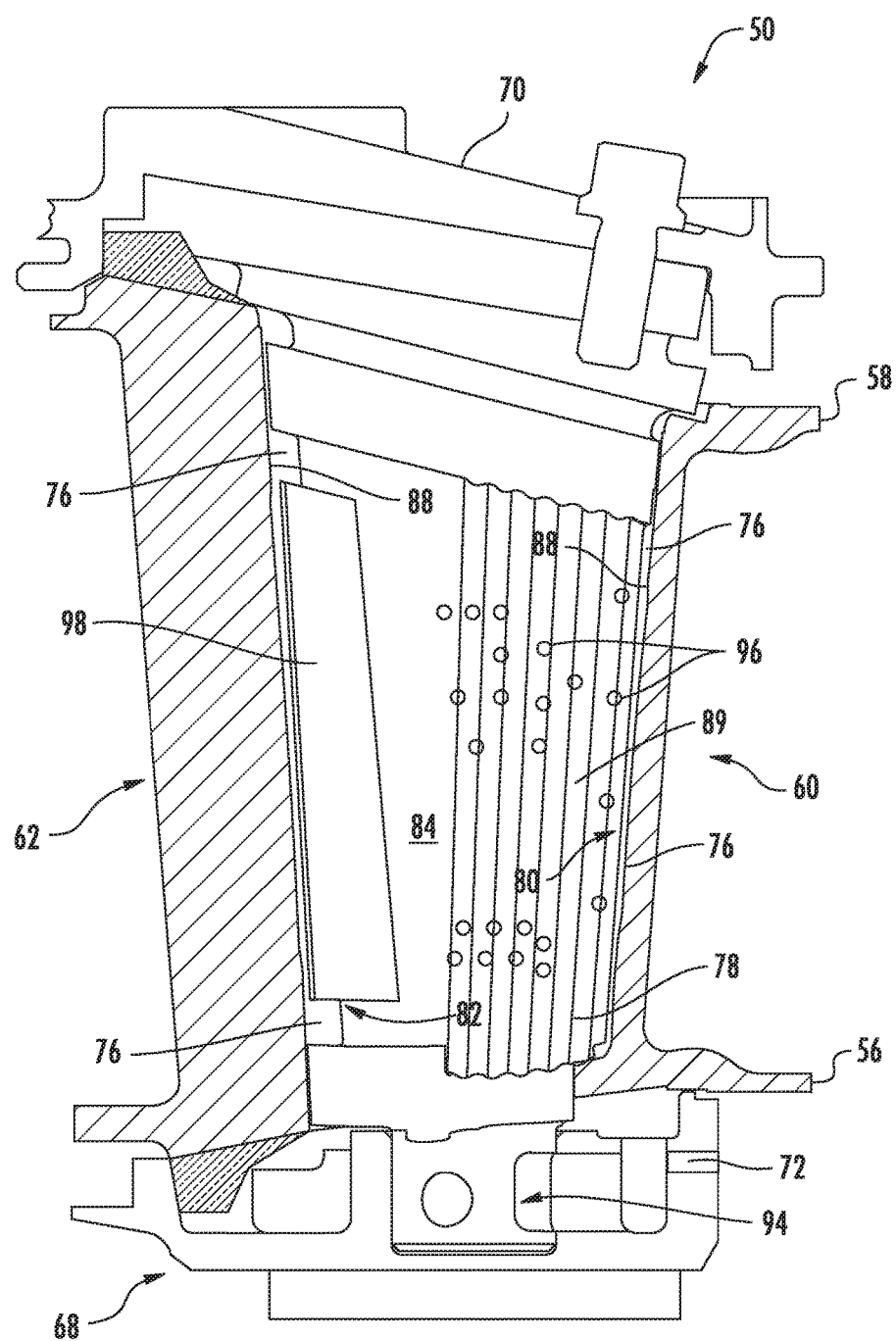
FIG. 5 is a cross sectional side view of the nozzle segment as shown in FIG. 3, according to at least one embodiment of the present invention.

FIG. 5 provides a cross sectioned side view of the stage 1 nozzle segment 50 with film holes as shown in FIG. 3, according to various embodiments of the present disclosure. In various embodiments, as shown in FIGS. 4 and 5, at least one nozzle segment 50 includes an insert or strut 78. When installed, as shown in FIG. 5, the strut 78 is positioned inside the radial cooling channel 76. The strut 78 may be connected to and/or in contact with the inner support ring 68 and/or the outer support ring 70.

Figure 8:
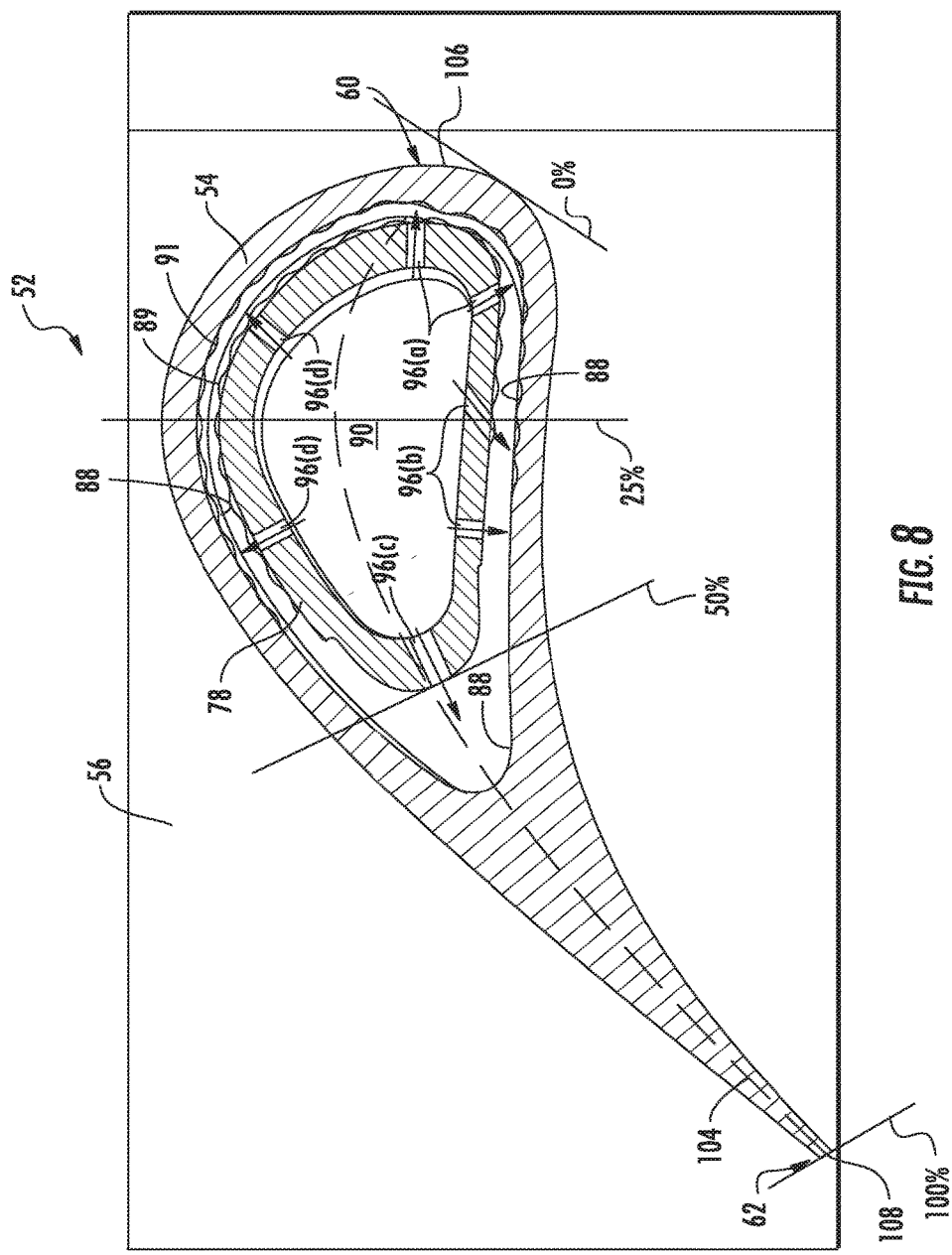
FIG. 8 is a cross sectional top view of an exemplary stage 2 stator component of the nozzle segment as shown in FIG. 3, according to at least one embodiment of the present invention.
Figure 9:
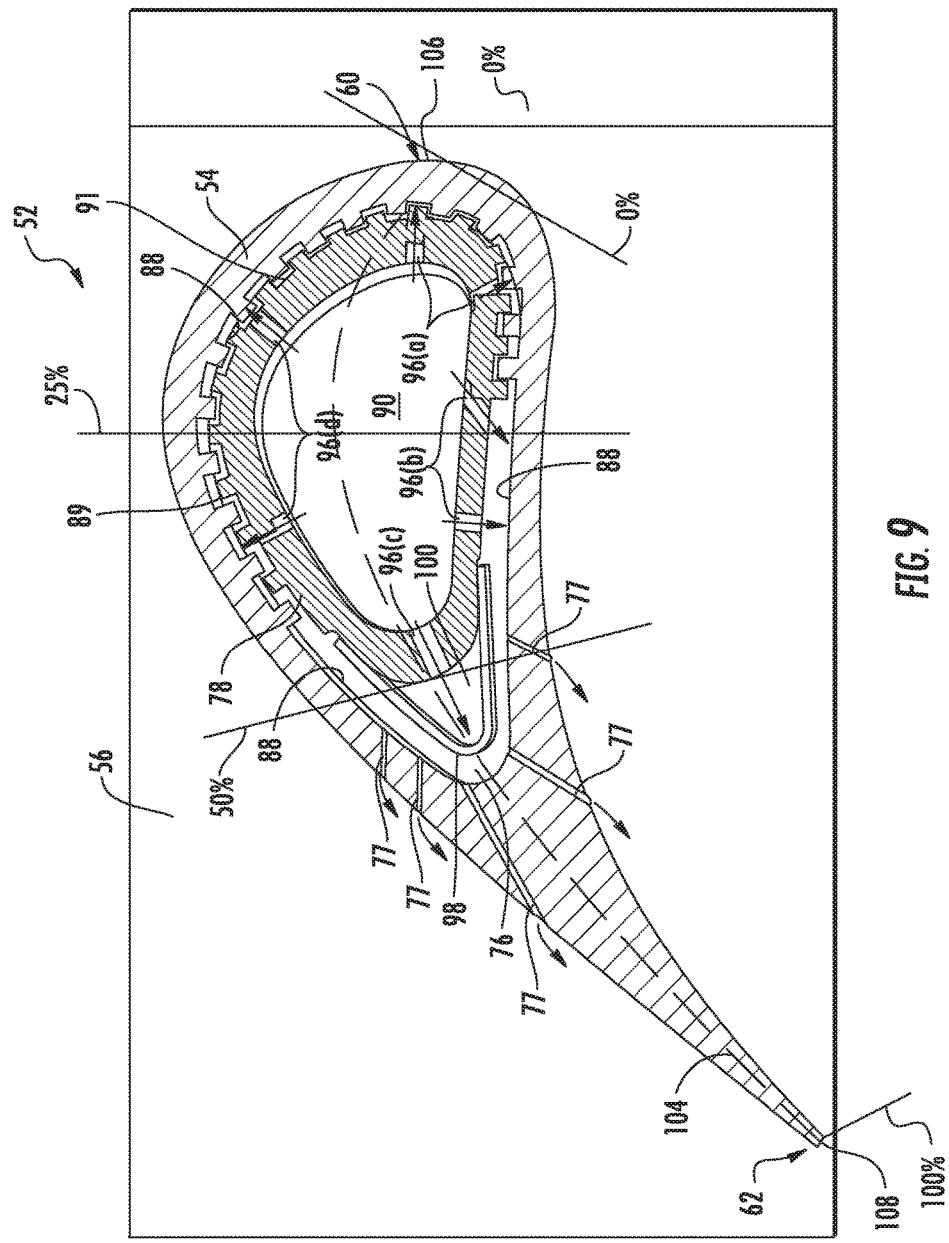
FIG. 9. is a cross sectional top view of a stage 1 stator component of the nozzle segment as shown in FIG. 3, according to at least one embodiment of the present invention.

The strut 78 generally includes a forward portion 80 and an aft portion 82. The strut 78 further includes a pressure side portion 84 that extends between the forward and aft portions 80, 82 camber-wise and in span and a suction side portion 86 that extends between the forward and aft portions 80, 82 camber-wise and in span. In particular embodiments, one or more of the forward portion 80, aft portion 82, pressure side portion 84 and the suction side portion 86 are formed or shaped to include alternating peaks and valleys that can, in one embodiment substantially correspond to the peaks and valleys of the airfoil inner surface 88 (FIG. 4) of the airfoil 54. The airfoil inner surface 88 and the strut outer surface 89 are, in particular embodiments, shaped in a corrugated pattern, wavy pattern, square pattern, sawtooth pattern, turbulator pattern, or mixtures thereof. The patterns can include airfoil peaks 110 and airfoil valleys 112 on the airfoil inner surface 88. Also, strut peaks 114 and strut valleys 116 can be included on the strut outer surface 89. The airfoil peaks 110 and valleys 112 may or may not correspond with the strut peaks 114 and valleys 116. In some embodiments as shown in FIGS. 8 and 9, the airfoil inner surface 89 defines a series of alternating airfoil peaks 110 and airfoil valleys 112 in the leading edge portion 60 such that the airfoil 54 has a varying cross-sectional thickness defined between the airfoil inner surface 88 and the airfoil outer surface 87 in the leading edge portion 60. The strut 78 can include a strut outer surface 89 that defines a plurality of apertures 96 (a-d) that provide for fluid communication from the inner radial cooling passage 90 to a radial cooling gap 91 defined between the airfoil inner surface 88 and the strut outer surface 89. The radial cooling gap 91 can have a cross-sectional distance between the airfoil inner surface 88 and the strut outer surface 89 that varies less than 15%.

As seen in FIGS. 8 and 9, the plurality of apertures 96(a-d) in the strut outer surface 89 can be directed onto the airfoil valleys 112 defined by the airfoil inner surface 88 in the leading edge portion 60 so as to impinge on the airfoil inner surface 88 within a local thin section. The plurality of apertures 96(a-d) can be arranged to provide impingement cooling at different airfoil thickness aperture positions in accordance with a predetermined airfoil cooling profile defined along camber length portions of the airfoil as well as the cooling profile variance in the radial direction.

The airfoil inner surface 88 can also define a series of alternating airfoil peaks 110 and airfoil valleys 112 in at least one of the pressure side wall 84 and the suction side wall 86 such that the airfoil 54 has a varying cross-sectional thickness defined between the airfoil inner surface 88 and the airfoil outer surface 87 in the at least one of the pressure side wall 84 and the suction side wall 86. Here, the plurality of apertures 96(a-d) in the strut outer surface 89 are directed onto the airfoil peaks 110 defined by the airfoil inner surface 88 within the at least one of the pressure side wall 84 and the suction side wall 86 so as to impinge on the airfoil inner surface 88 within a local thick section.

Figure 6:
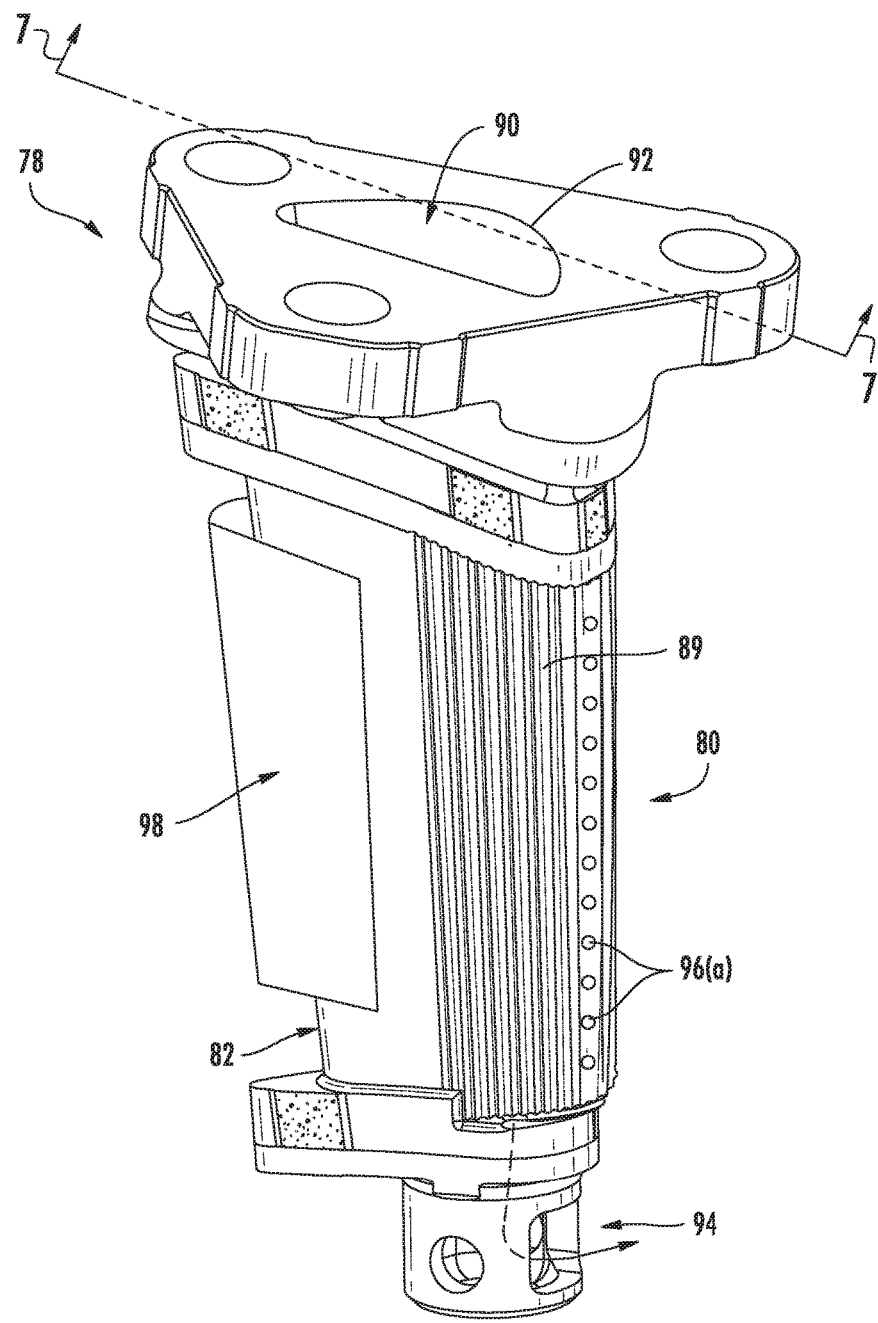
FIG. 6 is a perspective view of an exemplary insert of the nozzle segment as shown in FIG. 5, according to at least one embodiment of the present invention.
Figure 7:
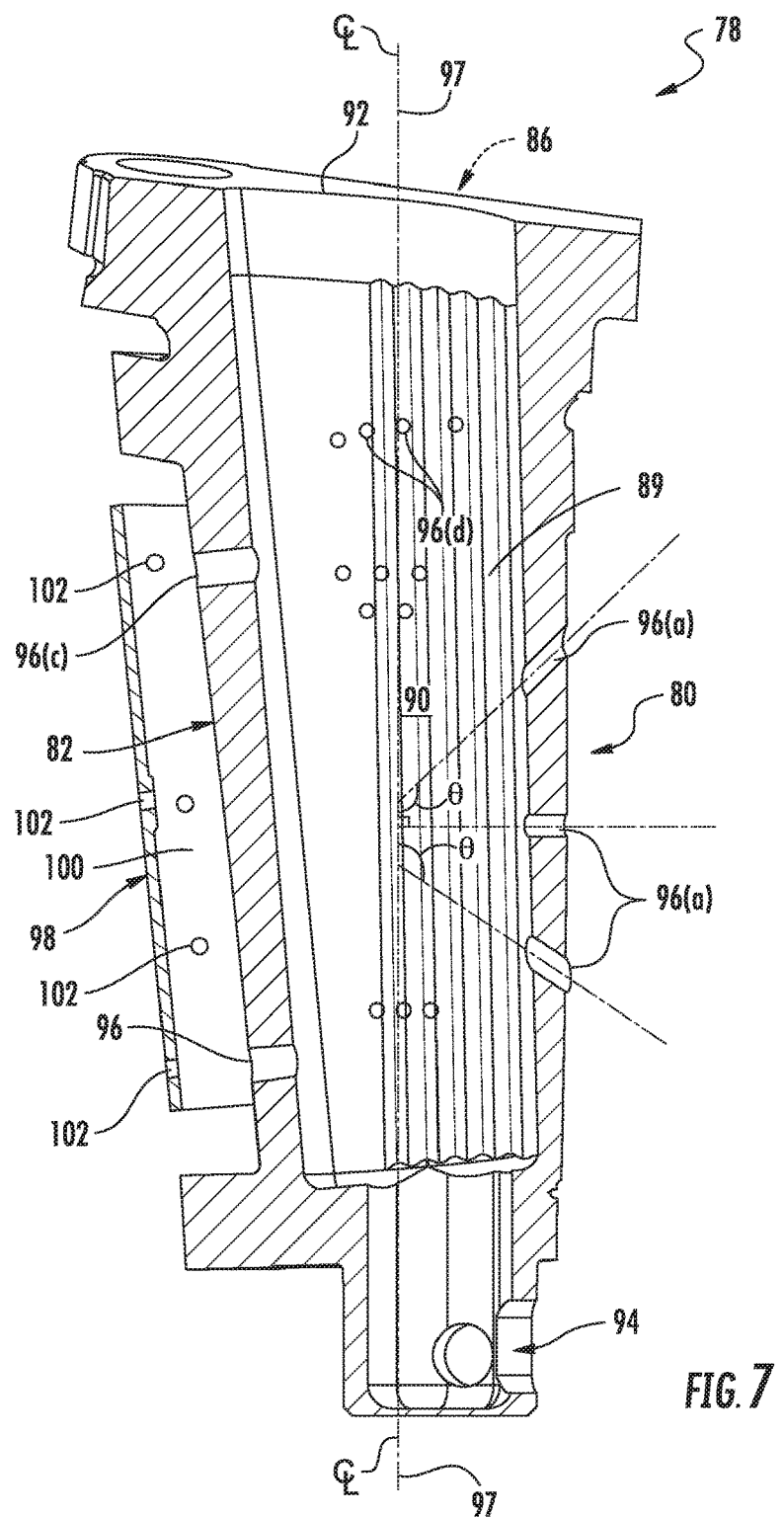
FIG. 7 is a cross sectional side view of an exemplary insert of the nozzle segment according to at least one embodiment of the present invention.

FIG. 6 is a perspective view of the strut 78 as shown in FIG. 5 removed from the nozzle segment 50 for clarity. FIG. 7 is a cross sectional side view of the strut 78 taken along section line 7 as shown in FIG. 6. As shown in FIGS. 6 and 7, the strut 78 defines an inner radial cooling passage 90, and defines and/or includes an inlet 92 to the inner radial cooling passage 90. In particular embodiments, the inlet 92 is in fluid communication with the cooling medium source via the cooling air inlet 74 of the outer support ring 70. The strut 78 may also include an outlet 94 that is in fluid communication with the inner radial cooling passage 90. Depending on the nozzle stage location, for example S1 of S2, the outlet 94 may be in fluid communication with the purge air passage 72 of the inner support ring 68 (FIG. 5).

In various embodiments, as shown in FIGS. 6 and 7 collectively, the strut 78 includes and/or defines a plurality of apertures 96(a-d). As a non-limiting example, apertures indicated as 96(a) can be formed along the forward portion 80 of the strut 78, 96(b) can be formed along the pressure side portion 84 of the strut 78, 96(c) can be formed along the aft portion 82 of the strut 78 and 96(d) can be formed along the suction side portion 86 of the strut 78 with a portion of the apertures positioned on the strut outer surface 89. The strut 78 defines an inner radial cooling passage 90 and a plurality of apertures 96(a-d), a portion of the apertures positioned on the strut outer surface 89 to provide for fluid communication from the inner radial cooling passage 90 through the radial cooling gap 91 and impinging on the airfoil inner surface 88. The plurality of apertures 96(a-d) are arranged to provide impingement cooling at different airfoil thickness aperture positions, such as in accordance with a predetermined airfoil cooling profile defined by camber 104 length portions of the airfoil 54. For example, a predetermined airfoil cooling profile can be a leading edge portion, from about zero percent to about twenty five percent of the camber 104 length, defining a local thin airfoil thickness (higher material heat conductance) aperture position portion; plus a mid-camber portion (from about twenty five percent to about fifty percent of the camber 104 length) defining a local thick airfoil thickness aperture position portion, plus a trailing edge portion (from about fifty percent to about one hundred percent of the camber 104 length) defining a portion with no apertures. Additionally, the predetermined airfoil cooling profile can gradually change the airfoil thickness aperture position, extending along a camber length portion, between adjacent airfoil thickness aperture positions. For example, the leading edge portion span can begin with a local thin airfoil thickness aperture position and gradually increase the airfoil thickness at the downstream aperture positions extending along the leading edge camber length portion until the adjacent mid-camber portion begins with a local thick airfoil thickness aperture position. Likewise, the mid-camber portion can begin with a local thick airfoil thickness aperture position and gradually decrease the airfoil thickness at the downstream aperture positions along the mid-camber camber length portion until the adjacent trailing edge portion begins with no apertures.

The apertures 96(a-d) provide for fluid communication from the inner radial cooling passage 90 through the strut 78 and into the radial cooling gap 91 inside the radial cooling channel 76 of the airfoil 54. Any of the apertures 96(a-d) may be formed and/or angled so as to provide impingement or jet cooling to the airfoil inner surface 88 of the airfoil 54.

As shown in FIG. 7, in particular embodiments, at least one of the apertures 96(a-d) particularly shown but not limited to apertures 96(a) may be formed so as to direct a flow of compressed air at the airfoil inner surface 88 (FIG. 8) at an angle Θ measured with respect to radial centerline 97 which is generally perpendicular with engine axis 40. The shape of the radial cooling gap can allow the apertures 96(a-d) to be formed at various angles Θ with respect to radial centerline to accommodate the shape of the strut outer surface 89 while maintaining the respective position of the apertures 96(a-d) required for cooling of the airfoil inner surface 88. For example, in particular embodiments, at least one aperture 96(a) may be formed at an angle Θ that is acute with respect to a right angle formed with radial centerline 97, substantially perpendicular to radial centerline 97 or at an angle Θ that is obtuse with respect to a right angle formed with radial centerline 97.

In particular embodiments, as shown in FIGS. 5, 6 and 7, an optional deflector shield or baffle 98 extends span-wise and camber-wise from the pressure side portion 84 around the aft portion 82 and to the suction side portion 86 of the strut 78. In particular embodiments, the optional baffle 98 may extend radially in span between about 50 to 100 percent of the total radial span of the strut 78. In one embodiment, the optional baffle 98 may have a thickness that is from about 5 to about 30 mils. The optional baffle 98 may be attached to the strut 78 via welded through-wall pins, with or without brazed edges or by any known suitable attaching means.

As shown in FIG. 7, the optional baffle 98 generally defines a flow passage 100 between the aft portion 82 of the strut 78 and the baffle 98. The flow passage 100 may be in fluid communication with the inner radial cooling passage 90 via one or more of the apertures 96(a-d). In particular embodiments, the flow passage 100 may be in fluid communication with the radial cooling gap 91 and the radial cooling channel 76 of the stator component 52. In particular embodiments, the baffle 98 may include and/or define one or more exhaust holes 102.

As previously presented herein, the positioning of the apertures 96(a-d) and/or the film holes 77 can prevent undesirable camberwise and/or through-wall thermal gradients in the airfoil 54 which result, at least in part, from a large temperature differential between compressed air flowing from the strut 78 against the airfoil inner surface 88 and the temperature of the combustion gases flowing across the outer surface 87 of the airfoil 54. FIG. 8 provides a cross sectional top view of one of the stator components 52, typical of a stage 2 nozzle section, taken along section line 8-8 as shown in FIG. 3 including the airfoil 54, the strut 78, and the inner band 56, airfoil inner surface 88, strut outer surface 89, and the radial cooling gap 91 according to at least one embodiment. FIG. 9 provides a cross sectional top view of one of the stator components 52, typical of a stage 1 nozzle section, as shown in FIG. 8 including the airfoil 54, the strut 78, the baffle 98 and the inner band 56, and film holes 77 according to at least one embodiment.

As shown in FIGS. 8 and 9, a mean camber line, or camber line 104 is defined from the leading edge portion 60 to the trailing edge portion 62 of the airfoil 54 midway between the suction (upper) side wall 66 and pressure (lower) side wall 64 of the airfoil. A distance taken between a starting point 106 of the camber line 104 and a termination point 108 of the camber line 104 is representative of one hundred percent of the camber length of the airfoil 54.

In one embodiment, the typical stage 2 stator component 52 is formed from a Ceramic Matrix Composite (CMC) material. As shown in FIG. 8, the apertures 96(a-d) are positioned along the strut 78 between zero percent of the camber length and about fifty percent of the camber length of the airfoil 54 so as to provide impingement and/or convective cooling to the inner surface 88 of the airfoil 54. In particular embodiments, the trailing edge portion 62 of the airfoil 54 is solid (without film holes) between about fifty percent of the camber length and one hundred percent of the camber length. In one embodiment, some apertures 96(a-d) are disposed in a local thin airfoil thickness aperture position between zero and twenty five percent of the camber length (leading edge portion), some apertures 96(a-d) are disposed in a local thick airfoil thickness aperture position between twenty five percent and fifty percent of the camber length (mid-camber portion), and the trailing edge portion 62 of the airfoil 54 is solid from fifty percent of the camber length to the termination point 108 or one hundred percent of the camber line 104.

In one embodiment, as shown in FIG. 9, the baffle 98 is connected to the strut 78 so as to prevent direct impingement cooling of the inner surface 88 of the airfoil 54 aft of the aft portion of the strut 78. In particular embodiments, the baffle 98 includes one or more of the exhaust holes 102 (FIG. 7). Some apertures 96(a-d) are disposed in a local thin airfoil thickness aperture position between zero and twenty five percent of the camber length (leading edge portion), some apertures 96(a-d) are disposed in a local thick airfoil thickness aperture position between twenty five percent and fifty percent of the camber length (mid-camber portion). The film holes 77 can be positioned along the airfoil 54 between about fifty percent of the camber length of the airfoil 54 and about one hundred percent of the camber length so as to provide film cooling to the pressure side wall 64 and/or the suction side wall 66.

Now referring to FIGS. 2-9 collectively, during operation, a cooling medium such as compressed air is directed through the inlet 92 of the strut 78 and into the inner radial cooling passage 90 that includes the radial cooling gap 91. The compressed air flows radially inwardly towards the outlet 94 of the strut 78. A portion of the compressed air as indicated by arrows flows through the various apertures 96(a-d) defined within the strut 78 and is impinged upon or directed towards the airfoil inner surface 88 of the airfoil 54 at various locations defined along the inner surface 88 of the airfoil 54 between zero percent and about 50 percent of the camber length, thus providing backside cooling to the airfoil 54.

In particular embodiments, as illustrated in FIG. 9, a portion of the compressed air is routed from the inner radial cooling passage 90 into the flow passage 100 defined by the baffle 98, thus preventing direct impingement cooling of the inner surface 88 of the airfoil 54 aft of the aft portion 82 of the strut 78. The compressed air may then flow from the flow passage 100 into the radial cooling channel 76, thus providing convection cooling to the inner surface 88 of the airfoil 54. As shown in FIGS. 8 and 9, at least a portion of the compressed air travels in the radial cooling gap 91 picking up extra heat from the additional surface area provided by the airfoil inner surface 88 before being exhausted through the airfoil 54 from the film holes 77, thus providing bore or through-hole cooling and/or film cooling to various portions of the airfoil 54. A remaining portion of the compressed air may be routed from the outlet 94 of the strut 78 into the rotor purge air passage 72.

The arrangement of the various apertures 96(a-d) in local thin and local thick airfoil thickness portions, along with the film holes 77 and the baffle 98, provide various technical benefits over known cooling schemes for airfoils of a stator component of a nozzle segment. For example, by positioning the apertures 96(a-d) to provide impingement cooling to the airfoil inner surface 88 of the airfoil 54 from zero to about 50 percent of the camber length of the airfoil 54, temperatures found within the radial cooling channel 76 may be closely matched with the temperature of the trailing edge temperatures, thus reducing through-wall and/or camberwise temperature gradients. In addition or in the alternative, the positioning of the apertures 96(a-d) provides flow to the trailing edge portion 62 of the airfoil 54 and to the inner and outer bands 56, 58 without requiring additional cooling to the leading edge portion 62 of the airfoil 54.

The baffle 98 may provide a flow path for dedicated trailing edge 62 and inner and outer band 56, 58 cooling flow while potentially reducing direct impact on airfoil 54 stresses. The solid trailing edge portion 62 may be at least partially enabled by the cooling configuration provided herein. More specifically, the solid trailing edge portion 62 may be at least partially enabled by using impingement, bore and film cooling along the provided percentages of the camber length of the airfoil 54 to reduce airfoil temperature gradients between the cavity and trailing edge.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stator component of a turbine engine, the stator component defining a span and a camber, the stator component comprising:
   an airfoil defining a radial cooling channel, the airfoil comprising an airfoil outer surface and an airfoil inner surface, wherein the airfoil outer surface defines a leading edge portion, a trailing edge portion, a pressure side wall, and a suction side wall, and wherein the airfoil inner surface defines a series of alternating peaks and valleys in the leading edge portion such that the airfoil has a varying cross-sectional thickness defined between the airfoil inner surface and the airfoil outer surface in the leading edge portion;
   a strut disposed within the radial cooling channel and defining an inner radial cooling passage, wherein the strut has an outer surface that defines a plurality of apertures that provide for fluid communication from the inner radial cooling passage to a radial cooling gap defined between the airfoil inner surface and the outer surface of the strut, wherein the strut defines a pressure side portion, a suction side portion, an aft portion, and a radial centerline extending through the strut, and wherein at least one aperture of the plurality of apertures defines an acute or obtuse angle relative to the radial centerline; and
   a baffle extending span-wise and camber-wise on the outer surface of the strut from the pressure side portion, around the aft portion, and to the suction side portion.

2. The stator component as in claim 1, wherein the outer surface of the strut defines a series of alternating peaks and valleys that substantially correspond to those of the airfoil inner surface.

3. The stator component as in claim 1, wherein the radial cooling gap has a cross-sectional distance between the airfoil inner surface and the outer surface of the strut that varies less than 15%.

4. The stator component as in claim 1, wherein the airfoil extends radially between an inner band and an outer band such that the stator component forms a nozzle segment.

5. The stator component as in claim 1, wherein the airfoil inner surface has, within the leading edge portion, a corrugated pattern, wavy pattern, square pattern, sawtooth pattern, turbulator pattern, or mixtures thereof.

6. The stator component as in claim 1, wherein the plurality of apertures in the outer surface of the strut are directed onto the valleys defined by the airfoil inner surface in the leading edge portion so as to impinge on the airfoil inner surface within a local thin section.

7. The stator component as in claim 1, wherein the plurality of apertures are arranged to provide impingement cooling in accordance with a predetermined airfoil cooling profile defined along camber length portions of the airfoil, wherein the arrangement of the plurality of apertures is determined by an airfoil cross-sectional thickness between the airfoil outer surface and the airfoil inner surface at the camber length portions of the airfoil.

8. The stator component as in claim 1, wherein the airfoil inner surface defines a series of alternating peaks and valleys in at least one of the pressure side wall and the suction side wall such that the airfoil has a varying cross-sectional thickness defined between the airfoil inner surface and the airfoil outer surface in the at least one of the pressure side wall and the suction side wall.

9. The stator component as in claim 8, wherein the radial cooling gap has a cross-sectional distance between the airfoil inner surface and the outer surface of the strut that varies less than 15%.

10. The stator component as in claim 8, wherein the plurality of apertures in the outer surface of the strut are directed onto the peaks defined by the airfoil inner surface within the at least one of the pressure side wall and the suction side wall so as to impinge on the airfoil inner surface within a local thick section.

11. The stator component as in claim 1, wherein the airfoil comprises a plurality of film holes in fluid communication with the radial cooling channel.

12. The stator component as in claim 11, wherein the plurality of film holes provide for bore cooling of the airfoil of at least one of the pressure side wall or the suction side wall.

13. The stator component as in claim 11, wherein the plurality of film holes provide for film cooling of the trailing edge portion of the airfoil.

14. The stator component as in claim 1, wherein the airfoil is formed from a ceramic matrix composite material, wherein the strut is formed from a metal material.

15. A nozzle assembly, comprising:
   a plurality of nozzle segments annularly arranged and coupled together via an outer support ring and an inner support ring, each nozzle segment comprising:
   a stator component, the stator component defining a span and a camber, the stator component having an airfoil defining a radial cooling channel, the airfoil comprising an airfoil outer surface and an airfoil inner surface, wherein the airfoil outer surface defines a leading edge portion, a trailing edge portion, a pressure side wall, and a suction side wall, and wherein the airfoil inner surface defines a series of alternating peaks and valleys in the leading edge portion such that the airfoil has a varying cross-sectional thickness defined between the airfoil inner surface and the airfoil outer surface in the leading edge portion;
   a strut disposed within the radial cooling channel and defining an inner radial cooling passage, wherein the strut has an outer surface that defines a plurality of apertures that provide for fluid communication from the inner radial cooling passage to a radial cooling gap defined between the airfoil inner surface and the outer surface of the strut, wherein the strut defines a pressure side portion, a suction side portion, an aft portion, and a radial centerline extending through the strut, and wherein at least one aperture of the plurality of apertures defines an acute or obtuse angle relative to the radial centerline; and
   a baffle extending span-wise and camber-wise on the outer surface of the strut from the pressure side portion, around the aft portion, and to the suction side portion.

16. The nozzle assembly as in claim 15, wherein the plurality of apertures in the outer surface of the strut are directed onto the valleys defined by the airfoil inner surface in the leading edge portion so as to impinge on the airfoil inner surface within a local thin section.

17. The nozzle assembly as in claim 16, wherein the airfoil inner surface defines a series of alternating peaks and valleys in at least one of the pressure side wall and the suction side wall such that the airfoil has a varying cross-sectional thickness defined between the airfoil inner surface and the airfoil outer surface in the at least one of the pressure side wall and the suction side wall.

18. The nozzle assembly as in claim 17, wherein the plurality of apertures in the outer surface of the strut are directed onto the peaks defined by the airfoil inner surface within the at least one of the pressure side wall and the suction side wall so as to impinge on the airfoil inner surface within a local thick section.

19. The nozzle assembly as in claim 17, wherein the radial cooling gap has a cross-sectional distance between the airfoil inner surface and the outer surface of the strut that varies less than 15%.

20. The nozzle assembly as in claim 15, wherein the stator component is formed from a ceramic matrix composite material, and wherein the strut is formed from a metal material.

* * * * *